United States Patent [19]

Adam

[11] 4,301,080

[45] Nov. 17, 1981

[54] 6/7-HALOGENOANTHRAQUINONE COMPOUNDS, AND THE PRODUCTION AND USE THEREOF

[75] Inventor: Jean-Marie Adam, St. Louis, France

[73] Assignee: Ciba-Geigy Corporation, Ardsley, N.Y.

[21] Appl. No.: 195,266

[22] Filed: Oct. 8, 1980

Related U.S. Application Data

[63] Continuation of Ser. No. 28,145, Apr. 9, 1979, abandoned.

[30] Foreign Application Priority Data

Apr. 21, 1978 [CH] Switzerland ............ 4328/78

[51] Int. Cl.³ .................................. C07C 143/665
[52] U.S. Cl. .................................. 260/371; 260/374; 260/372; 260/373
[58] Field of Search ............ 260/371, 372, 373, 374, 260/378, 380, 381; 8/39 B, 39 C

[56] References Cited

U.S. PATENT DOCUMENTS

| | | | |
|---|---|---|---|
| 2,433,551 | 12/1947 | Gutzwiller | 260/381 |
| 2,688,028 | 8/1954 | Gutzwiller | 260/381 |
| 3,491,126 | 1/1970 | Schwander et al. | 260/381 |
| 3,617,172 | 11/1971 | Hosoda | 260/380 |
| 3,646,071 | 2/1972 | Frey et al. | 260/381 |

FOREIGN PATENT DOCUMENTS 1386922 3/1975 United Kingdom .

*Primary Examiner*—Winston A. Douglas
*Assistant Examiner*—Raymond K. Covington
*Attorney, Agent, or Firm*—John P. Spitals; Edward McC. Roberts

[57] ABSTRACT

There are described novel blue 6/7-halogenoanthraquinone compounds or mixtures thereof of the formula I

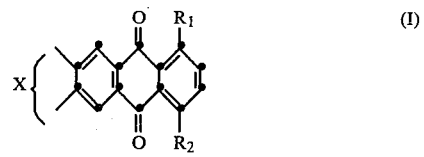

in which X is a halogen atom which is in the 6- or 7-position of the anthraquinone molecule, $R_1$ is a phenylalkylamino group, and $R_2$ is the —OH, —NH$_2$, —NH-alkyl, —NH-phenyl or phenylalkylamino group, and the phenyl groups in $R_1$ and/or $R_2$ can be further substituted and can contain a water-solubilizing group, the production thereof and their use as acid dyes or disperse dyes for dyeing and printing of in particular textile materials made from polyamide or polyester.

6 Claims, No Drawings

6/7-HALOGENOANTHRAQUINONE COMPOUNDS, AND THE PRODUCTION AND USE THEREOF

This is a continuation of application Ser. No. 28,145 filed on Apr. 9, 1979, now abandoned.

The invention relates to novel 6/7-halogenoanthraquinone compounds, to processes for producing them, to their use as dyes for dyeing and printing textile materials, and to the textile materials dyed and printed by means of these compounds.

The novel 6/7-halogenoanthraquinone compounds correspond to the formula I

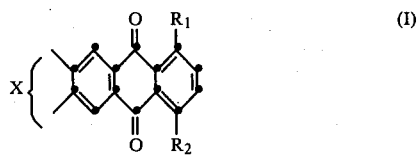

in which X is a halogen atom which is in the 6- or 7-position of the anthraquinone molecule, $R_1$ is a phenylalkylamino group, and $R_2$ is the —OH, —NH$_2$, —NH-alkyl, —NH-phenyl or phenylalkylamino group, and the phenyl groups in $R_1$ and/or $R_2$ can be further substituted and can contain a water-solubilising group. There is preferably employed a mixture of a 6-halogenoanthraquinone compound of the formula

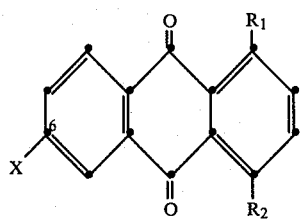

with a 7-halogenoanthraquinone compound of the formula

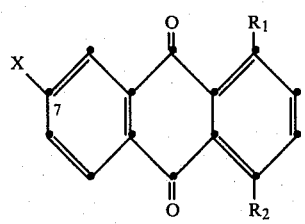

in which formulae the symbols X, $R_1$ and $R_2$ have the meanings given under the formula I.

The two components in the 6/7-halogenoanthraquinone compound mixture are advantageously present in the ratio of about 1:1.

Preferred anthraquinone compounds are those which contain in the phenyl group in $R_1$ and/or $R_2$ at least one water-solubilising group, especially an —SO$_3$H group, and in particular those which contain only one SO$_3$H group in the phenyl group in $R_1$.

As a halogen atom, X is for example a fluorine, chlorine or bromine atom. It is preferably the chlorine atom.

The alkylene group in the phenylalkylamino group according to the symbol $R_1$ is in particular a straight-chain or branched-chain alkylene group having 1 to 7 carbon atoms or a cycloalkylene group. This alkylene group is for example the methylene, ethylene or n- or iso-propylene group, the n- or sec- or tert-butylene group, the n- or sec- or tert-pentylene, -hexylene or -heptylene group or the cyclohexylene group. Preferably $R_1$ is a branched-chain alkylene group, particularly the sec-butylene group.

The phenyl group in the phenylalkylamino group according to the symbol $R_1$ can be unsubstituted or substituted. Substituents are for example: halogen such as fluorine, chlorine or bromine; alkyl groups having 1 to 4 carbon atoms, such as the methyl, ethyl or propyl group; alkoxy groups having 1 to 4 carbon atoms, such as the methoxy, ethoxy, propoxy or butoxy group; water-solubilising groups, particularly the —SO$_3$H group, and a group of the formula —CH$_2$—NH—CO—Y wherein Y is an alkyl group which is unsubstituted or mono- or di-substituted by halogen, an unsubsituted phenyl group, or a phenyl group which is substituted by halogen or alkyl.

If $R_2$ is the —NH-alkyl group, the alkyl group can be straight-chain, branched-chain or cyclic and it preferably has 1 to 9 carbon atoms. Mentioned as $R_2$ in this connection are for example: the methyl, ethyl or n- and iso-propyl group, the n-, sec- or tert-butyl group, the cyclohexyl group and the trimethylcyclohexylamino group.

If $R_2$ is the —NH-phenyl group, the phenyl group can be further mono- or polysubstituted. Substituents are for example: acylamino groups such as the acetylamino or benzoylamino group; alkyl groups having 1 to 4 carbon atoms, such as the methyl, ethyl or n- and iso-propyl group, and the straight-chain or branched-chain butyl group; alkoxy groups having 1 to 4 carbon atoms, such as the methoxy, ethoxy and propoxy group; the phenoxy group; a heterocyclic group, such as the benzothiazole group, water-solubilising groups, especially the SO$_3$H group, or a group of the formula —CH$_2$—NH—CO—Y wherein Y is an alkyl group which can be mono- or disubsituted by halogen, or an unsubstituted phenyl group, or a phenyl group which is further substituted by halogen or alkyl.

If $R_2$ is a phenyl-alkyl-amino groups, the alkyl group here too, analogously to the radical $R_1$, can be straight-chain, branched-chainor cyclic, and in the case of alkyl can contain 1 to 7 carbon atoms, whilst the phenyl group is unsubstituted or is substituted by for example halogen, such as fluorine, chlorine or bromine, and by the substituents mentioned with respect to the —NH-phenyl group according to the symbol $R_2$. In the case of the phenyl-cycloalkyl-amino group, the cycloalkyl group is in particular one containing 5 to 8 carbon atoms; it is above all the cyclohexyl group.

In preferred anthraquinone compounds, $R_2$ is an NH-phenyl group wherein the phenyl group is further substituted, especially once or several times by an alkyl group (C$_1$–C$_4$), by an alkoxy group (C$_1$–C$_4$), by an acylamino group or by cyclohexyl.

Interesting anthraquinone compounds correspond also to the formula Ia

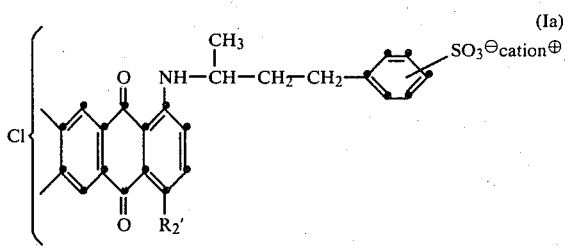

in which the phenyl group can be further substituted by a chloroacetylaminomethylene group, and $R_2'$ is the —$NH_2$ or —NH—$C_3H_7$ group or a phenylamino group, wherein the phenyl group can be mono- or polysubstituted by an alkyl group ($C_1$—$C_3$), an alkoxy group $C_1$-$C_4$, an acetylamino group or the cyclohexyl group.

The 6/7-halogenoanthraquinone compounds according to the invention are blue compounds and, on application in the dyeing process, are distinguished by good substantivity on textile materials, especially on synthetic polyamide and wool.

The 6/7-halogenoanthraquinone compounds of the formula I are produced for example by reacting an anthraquinone compound of the formula II, or a mixture of such compounds,

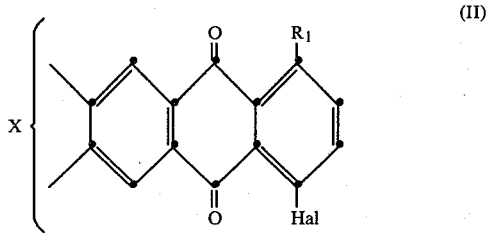

in which X and $R_1$ are as defined under the formula I, and "Hal" is a halogen atom, by hydrolysis of the halogen atom in the 4-position or by condensation with a compound introducing the radical $R_2$, and optionally sulfonating the compounds obtained.

The starting materials are preferably those compounds of the formula II in which X is the chlorine atom and "Hal" is the bromine atom.

As a result of the hydrolysis of compounds of the formula II, the halogen atom in the 4-position is replaced by the OH group. The hydrolysis itself is performed for example in a mixture of oleum with about 10% of free $SO_3$ and boric acid at a temperature of about 100° C.

The condensation of compounds of the formula II with a compound introducing ehe radical $R_2$ is performed with amines which introduce the radical of the formula -$NH_2$,

the condensation reaction is performed in an organic medium (for example cellosolve or butanol), at a temperature of about 100° to 150° C. depending on the boiling point of the employed solvent, in a known manner and in the presence of a catalyst, such as copper powder or copper salt, and of a base. It is also possible for the amine itself to be used as solvent.

Suitable amines which introduce the radical $R_2$ are for example: ammonia or p-toluenesulfonamide with subsequent saponification; alkylamines such as methylamine, ethylamine, isopropylamine and butylamine; phenylamines such as phenylamine, 2-methylphenylamine, 4-methylphenylamine, 4-isopropylphenylamine, 2,4-dimethylphenylamine, 3,4-dimethylphenylamine, 2,5-dimethylphenylamine, 2-methyl- 5-methoxyphenylamine, 2,3-dimethylphenylamine, 2,6-dimethylphenylamine, 2,4,6-trimethylphenylamine, 4-ethylphenylamine, 2-ethylphenylamine, 4-tert-butylphenylamine, 2-methoxyphenylamine, 2-ethoxyphenylamine, 4-methoxyphenylamine, 2,5-dimethoxyphenylamine, 4-butoxyphenylamine, 4-acetylaminophenylamine, 4-phenoxyphenylamine, 4-(4'-methyl)-phenoxyphenylamine, 4-(6'-methyl)-benzothiazolephenylamine and 2-methoxy-5-methylphenylamine; phenylalkylamines such as benzylamine and phenyl-isobutyl-amine; phenylcycloalkylamines such as phenylcyclohexylamine; then cyclohexylaimine and 3,5,5-trimethylcyclohexylamine, as well as 4-cyclohexyl-phenylamine.

Subsequent to hydrolysis or condensation, the compounds free from water-solubilising groups can also be sulfonated, for example with oleum containing 1 to 10% of free $SO_3$, at a temperature of 0° to 30° C., or with $H_2SO_4$ (95-100%), where surprisingly a selective monosulfonation occurs. If it is desired that the end product of the formula I contains in the phenyl group $R_1$ and/or $R_2$ the stated substituent of the formula —$CH_2$—NH—CO—Y, it is advantageous to introduce this substituent before sulfonation. The introduction of a group of this kind is performed according to Tschernisk-Einhorn by reacting the anthraquinone mixture, obtained by hydrolysis or condensation with the compound II, with a methylolamide which carries on the N atom the group —COY, in an acid medium, preferably in concentrated sulfuric acid.

The 6/7-halogenoanthraquinone compounds of the formula I which contain no water-solubilising groups are used, singly or preferably as mixtures, as disperse dyes for dyeing and printing materials, particularly textile materials, which are dyeable with disperse dyes. Suitable materials of this type are: mixed polymers formed from dicyanoethylene and vinyl acetate, fibres made from polyurethanes, and polypropylene fibres, as well as fibres made from cellulose tri- and 2½-acetate, and especially fibres from aromatic polyesters, such as those made from terephthalic acid and ethylene glycol, and mixed polymers formed from terephthalic acid and isophthalic acid and ethylene glycol. These materials are dyed in a known manner, and the dyeing obtained can be subjected to an aftertreatment, for example by being heated in an aqueous solution of an ion-free detergent. There are obtained heavy dyeings and printings having good fastness properties, particularly fastness to light and to wet processing.

Deeply coloured dyeings are likewise obtained on application of the dyes from organic solvents, with the dye being applied from a solvent, in which it is dissolved or is present as a fine dispersion, to the textile material to be dyed. Suitable organic solvents are for example petroleum fractions and, in particular, chlorinated hydrocarbons (for example perchloroethylene), which can be used on their own or as a dispersion together with water.

When the 6/7-halogenoanthraquinone compounds of the formula I contain water-solubilising groups, especially the $SO_3H$ group, water-soluble compounds of this type can be used as acid dyes for dyeing and printing materials, particularly textile materials, which are dyeable with acid dyes. Suitable materials of this kind are for example natural and synthetic polyamide materials, such as wool, silk and nylon. All these materials can be in the most varied forms of make-up, and can be dyed by conventional exhaust or padding processes. Dyeings which have good fastness properties, such as fastness to light and to wet processing, are obtained.

Instead of being applied by impregnation, both the disperse dyes and the acid dyes can also be applied by printing. For this purpose is used for example a printing ink containing the dye together with the auxiliaries customary in the printing industry, such as wetting and thickening agents.

The invention relates also to the novel intermediates of the formula II

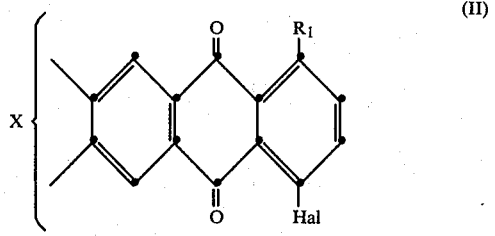

(II)

in which X is a haologen atom which is in the 6- or 7-position of the anthraquinone molecule, $R_1$ is a phenylalkylamino group, wherein the phenyl group can be further substituted and can contain a water-solubilising group, and "Hal" is a halogen atom.

The meaning of the symbols X and $R_1$ is in this case identical to that given under the formula I. In preferred intermediates, X is the chlorine atom, and $R_1$ is a phenylalkylamino group, wherein the alkyl group is straight-chain ($C_1$–$C_7$) or branched-chain ($C_1$–$C_7$), or a cyclohexyl group, and the phenyl group thereof is unsubstituted, and "Hal" is a bromine atom.

These intermediates of the formula II are obtained by selective halogenation, which results when a 1,6/1,7-dihalogenoanthraquinone compound of the formula

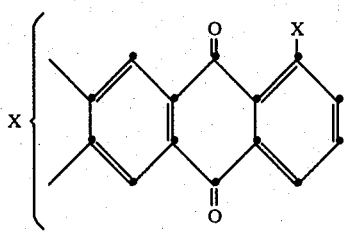

in which X in each case is the same halogen atom, preferably chlorine, is converted by amination with a phenylalkylamino compound introducing the radical $R_1$ (see for example German Offenlegungsschrift No. 2,513,950) into an anthraquinone compound of the formula

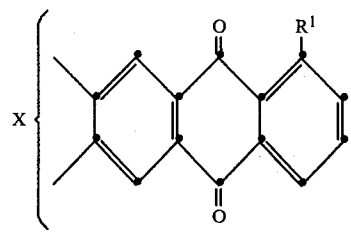

in which $R_1$ has the meaning given under the formula I; and this is then reacted with 1 equivalent of halogen, particularly bromine. The reaction with halogen is performed in an organic solvent at a temperature of about 40° to 60° C.

It is in this connection surprising that when the halogenation occurs the halogen atom is bound preferentially in the 4-position of the anthraquinone nucleus.

It is furthermore advantageous that the starting products used are products containing no water-solubilising groups. If intermediates of the formula II which contain a water-solubilising group in the phenyl nucleus of $R_1$ are desired, the introduction of this group, in particular the sulfo group, is effected subsequent to the halogenation.

Phenylalkylamino compounds introducing the radical $R_1$ are for example: ω-phenylbutylamines, especially ω-phenyl-sec-butylamine; phenylmethylamine; ω-phenyl-iso-hexylamine; ω-phenyl-iso-pentylamine; ω-phenyl-iso-heptylamine; and 4-phenylcyclohexylamine.

These intermediates are used for producing especially acid dyes or disperse dyes.

The particular advantage of the invention is that it is possible to use as starting compounds for producing the anthraquinone dyes of the formula I and intermediates of the formula II hitherto useless waste products (for example residues of anthraquinone nitrations).

The invention is further illustrated by the following Examples without being limited to them. The term 'parts' denotes parts by wieght, and temperature values are in degrees Centigrade.

EXAMPLE 1

A mixture consisting of 27.7 parts of 1,6/1,7-dichloroanthraquinone and 35 parts of phenyl-sec-butylamine is stirred at 155° for 15 hours. The phenyl-secbutylamine still present is distilled off by means of steam, and the reaction product of the formula

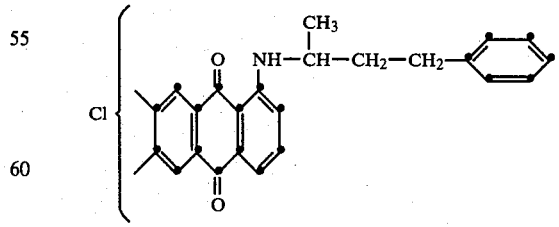

is isolated. 13.5 parts of the product thus obtained are stirred up in 75 parts of chlorobenzene at 35° and, after the addition of 8 parts of bromine, the mixture is held at 40° to 50° for 15 hours. The solvent is distilled off in vacuo, whereupon the intermediate of the formula

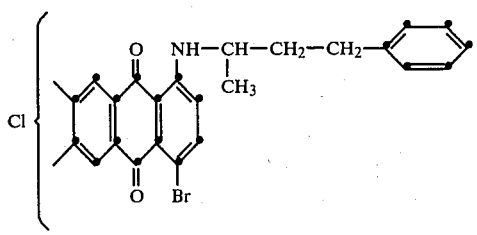

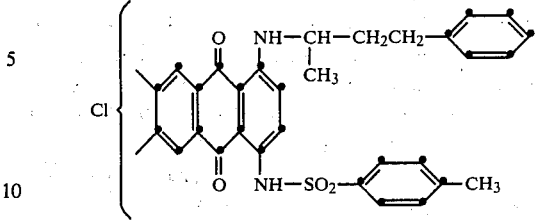

precipitates and is isolated by filtration.

If there are used, instead of the condensation product from 1,6/1,7-dichloroanthraquinone with phenyl-sec-butylamine, equivalent parts of the condensation products listed in the following Table 1, and these are reacted, analogously to the given procedure, with 8 parts of bromine, there are obtained the intermediates brominated in the 4-position of the anthraquinone nucleus.

TABLE 1

Condensation product

| Example | $R_1$ |
|---|---|
| 2 | —NH—CH₂—C₆H₅ |
| 3 | —NH—CH(CH₃)—CH₂—C(CH₃)₂—C₆H₅ |
| 4 | —NH—CH₂—CH₂—C(CH₃)₂—C₆H₅ |
| 5 | —NH—CH(CH₂—CH(CH₃)₂)—CH₂—CH₂—C₆H₅ |
| 6 | —NH—(fluorenyl) |

EXAMPLE 7

23.5 parts of 1-phenyl-sec-butylamino-4-bromo-6/7-chloroanthraquinone obtained according to Example 1, 17 parts of p-toluenesulfonamide, 5 parts of potassium acetate and 0.5 part of copper powder are mixed in 100 parts of ethyl cellosolve at 130° for 4 hours with stirring. After cooling, the reaction product of the formula is filtered off, and dried in vacuo. The dried reaction product is introduced into 200 parts of 98% sulfuric acid, and the temperature is maintained for 5 hours at 25° to 30°. At the end of this period of time, the sulfuric acid solution is poured out into ice water, and the sulfonated saponification product of the formula

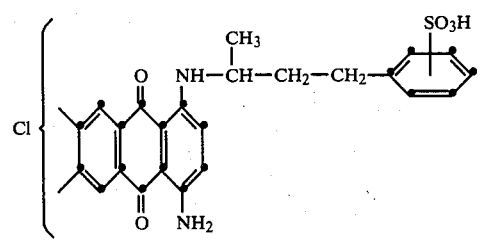

is isolated by filtration and the filter residue is washed approximately acid-free with concentrated NaCl solution; it is then suspended in 300 parts of water, and the suspension is rendered alkaline with sodium hydroxide. The dark-violet-blue sodium salt is precipitated by the addition of NaCl, filtered off and dried. From a weakly acid to acid bath, this acid dye dyes wool and synthetic polyamide fibres in blue shades.

EXAMPLE 8

A mixture consisting of 23.5 parts of 1-phenyl-sec-butylamino-4-bromo-6/7-chloroanthraquinone, 20 parts of isopropylamine, 5 parts of potassium acetate, 0.5 part of copper-(I) chloride, 0.2 part of water and 50 parts of n-butanol is stirred for 24 hours at 120° in an autoclave. The butanol is distilled off by means of steam, and the precipitated reaction product of the formula

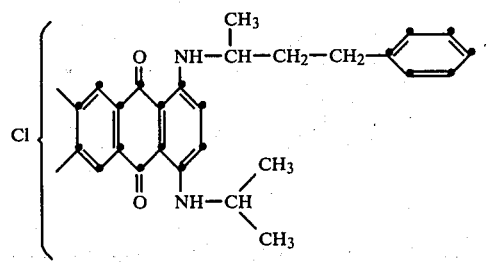

is isolated by filtration, purified by recrystallisation from methyl cellosolve, and sulfonated as described in Example 7.

The resulting acid dye of the formula

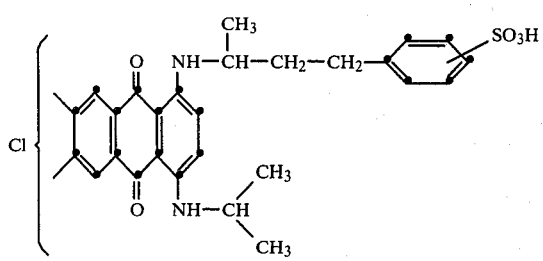

dyes wool and synthetic polyamide fibres in greenish-blue shades having very good fastness to light.

By using, in place of isopropylamine, cyclohexylamine or 3,5,5-trimethylcyclohexylamine in equivalent amounts, and otherwise proceeding as given in Example 8, there are obtained acid dyes having similar properties.

EXAMPLE 9

4.5 parts of the reaction product, 1-phenyl-sec-butylamino-4-isopropylamino-6/7-chloroanthraquinone, obtained according to Example 8, with 1.5 parts of N-methylol chloroacetamide are dissolved portionwise in 20 parts of 35% sulfuric acid at 0° to 5°, and stirring is maintained for 15 hours at 0° to 5°. An addition of 10 parts of 25% oleum is then made, and the mixture is stirred at 25° until the reaction is complete. The reaction mixture is subsequently poured into ice water, and the precipitated acid dye of the formula

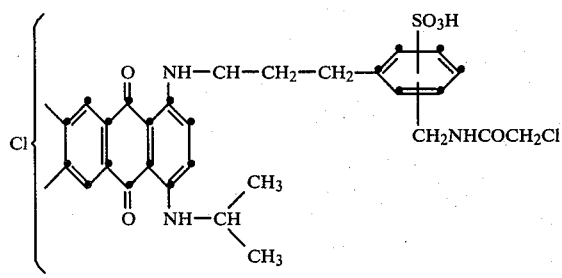

is filtered off with suction. The residue is suspended in water, and the pH value is adjusted to 7 with sodium hydroxide solution. The sodium salt of the dye is then precipitated by the addition of 5 percent by volume of NaCl. This salt dyes polyamide fibres and wool in greenish-blue shades having very good fastness to wet processing.

EXAMPLE 10

23.5 parts of the 1-phenyl-sec-butylamine-4-bromo-6/7-chloroanthraquinone produced according to the data given in Example 1, 10 parts of p-toluidine, 5 parts of potassium acetate and 0.2 part of copper(I) chloride are heated in 100 parts of n-butanol at 100° to 105° for 6 hours with stirring. The mixture is allowed to cool; the product of the formula

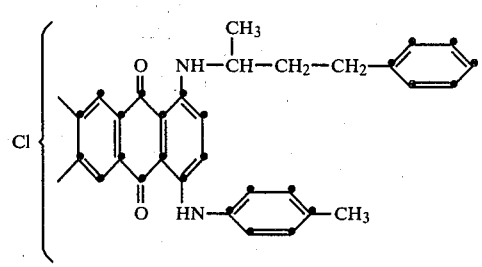

which has precipitated is filtered off, washed with methanol and dried in vacuo. 10 parts of the condensation product thus obtained are dissolved in 100 parts of 100% sulfuric acid, and the solution is stirred at 25° for 3 hours. The solution is subsequently poured onto the ice, whereupon the acid dye of the formula

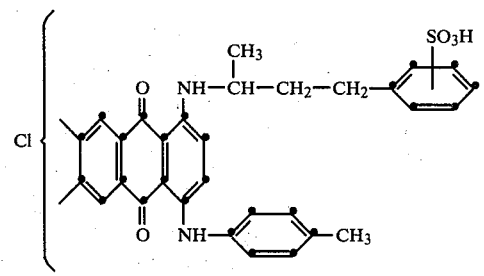

precipitates. The sodium salt is produced as described in Example 7.

The dye dyes wool and synthetic polyamide fibres in greenish-blue shades having good fastness to light and good fastness to wet processing.

By using, instead of the p-toluidine mentioned in the foregoing, equivalent amounts of one of the amines listed in Table 2, with otherwise the same procedure, there are obtained acid dyes of which the shade on polyamide is given in the last column of the Table.

TABLE 2

| Example | Amine | Shade |
|---|---|---|
| 11 | H₂N—C₆H₅ | greenish-blue |
| 12 | H₂N—C₆H₄—OCH₃ (with CH₃) | " |
| 13 | H₂N—C₆H₄—NHCOCH₃ | " |
| 14 | H₂N—C₆H₃(CH₃)—CH₃ | " |
| 15 | H₂N—C₆H₄—OCH₃ | " |
| 16 | H₂N—C₆H₄—OC₄H₉ | " |
| 17 | H₂N—C₆H₄—C(CH₃)₃ | " |

TABLE 2-continued

| Example | Amine | Shade |
|---|---|---|
| 18 | H₂N–⟨phenyl⟩–⟨phenyl⟩–H | " |
| 19 | H₂N–⟨phenyl with CH₃, CH₃⟩ | blue |
| 20 | H₂N–⟨phenyl with CH₃, CH₃, CH₃, CH₃⟩ | blue |

EXAMPLE 21

A dye bath is prepared from 400 parts of water, 4 parts of ammonium acetate, 2 parts of the dye according to Example 7 and sufficient acetic acid to bring the pH value of the bath to 6.0. 100 parts of a synthetic polyamide tricot are introduced into the dye bath obtained; the bath is heated within half an hour to boiling, and the material is dyed at 100° for 45 minutes. A blue dyeing having good fastness to light and good fastness to wet processing is obtained.

What is claimed is:

1. A process for producing monosulfonated 6/7-halogenoanthraquinone compounds or mixtures thereof of the formula (I)

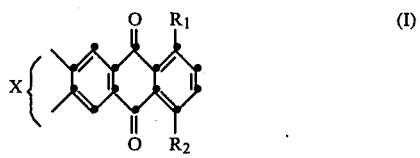

(I)

wherein X is a halogen atom which is in the 6- or 7-position of the anthraquinone molecule, $R_1$ is a phenylalkylamino group wherein the phenyl group thereof contains a -SO₃H group and can be further substituted, and $R_2$ is a -NH-phenyl group wherein the phenyl group thereof is unsubstituted or is mono- or polysubstituted by $C_1$-$C_4$ lower alkyl, $C_1$-$C_4$ lower alkoxy, acylamino or cyclohexyl, which process comprises (a) reacting a compound or a mixture of such compounds of the formula III

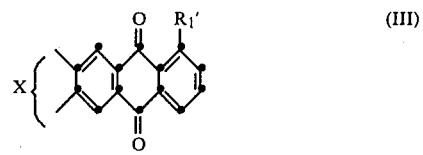

(III)

wherein $R_1'$ corresponds to $R_1$ but is free from said -SO₃H group, with a halogen to yield an anthraquinone compound, or a mixture of such compounds, of the formula II

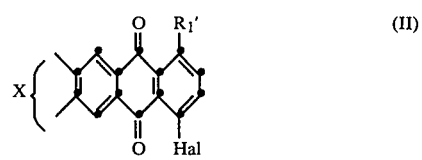

(II)

in which X and $R_1'$ are as defined above, and "Hal" is a halogen atom, (b) reacting this compound or mixture of compounds of the formula II by condensation with a phenylamine, thereby introducing the radical $R_2$, and (c) sulfonating the resulting compound or mixtrue of compounds in the phenyl nucleus of $R_1'$ at a temperature of 0°-30° C. with oleum containing 1-10% of free SO₃ or with 95-100% H₂SO₄ to obtain the monosulfonated compound or mixture of compounds of the formula I.

2. A process according to claim 1, wherein X is chloro, the halogen introduced in step (a) is bromine, and "Hal" is bromo.

3. A process according to claim 1 wherein $R_1'$ is a phenylalkylamino group in which the alkyl group is straight-chain or branched chain and contains 1 to 7 carbon atoms.

4. A process according to claim 3, wherein the alkyl group is $R_1'$ is branched chain.

5. A process according to claim 4, wherein the alkyl group in $R_1'$ is the sec-butyl group.

6. A process according to claim 1, wherein the phenyl group in $R_2$ is mono- or polysubstituted by $C_1$-$C_4$ lower alkyl, $C_1$-$C_4$ lower alkoxy, acylamino or cyclohexy.

* * * * *